Patented May 21, 1929.

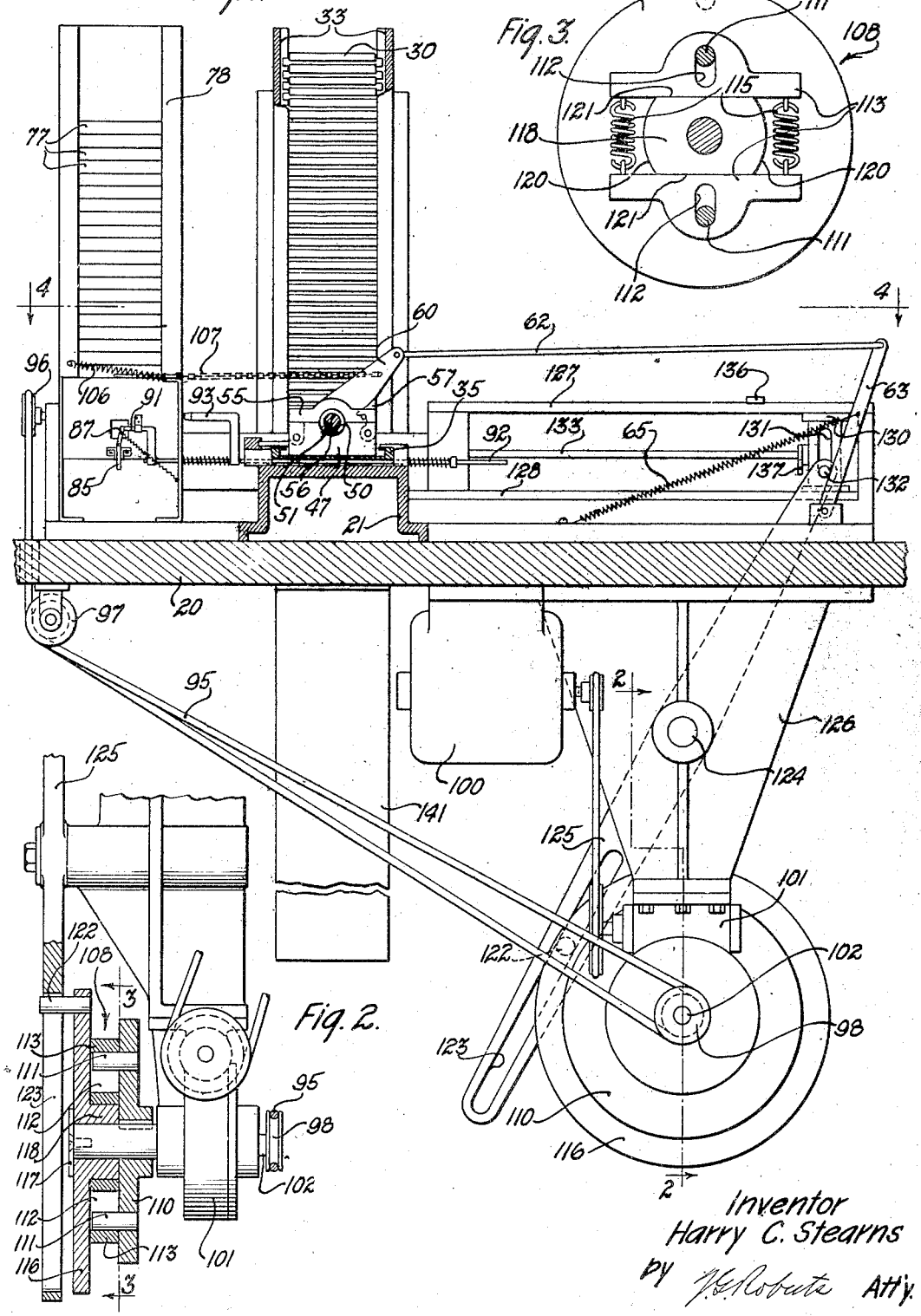

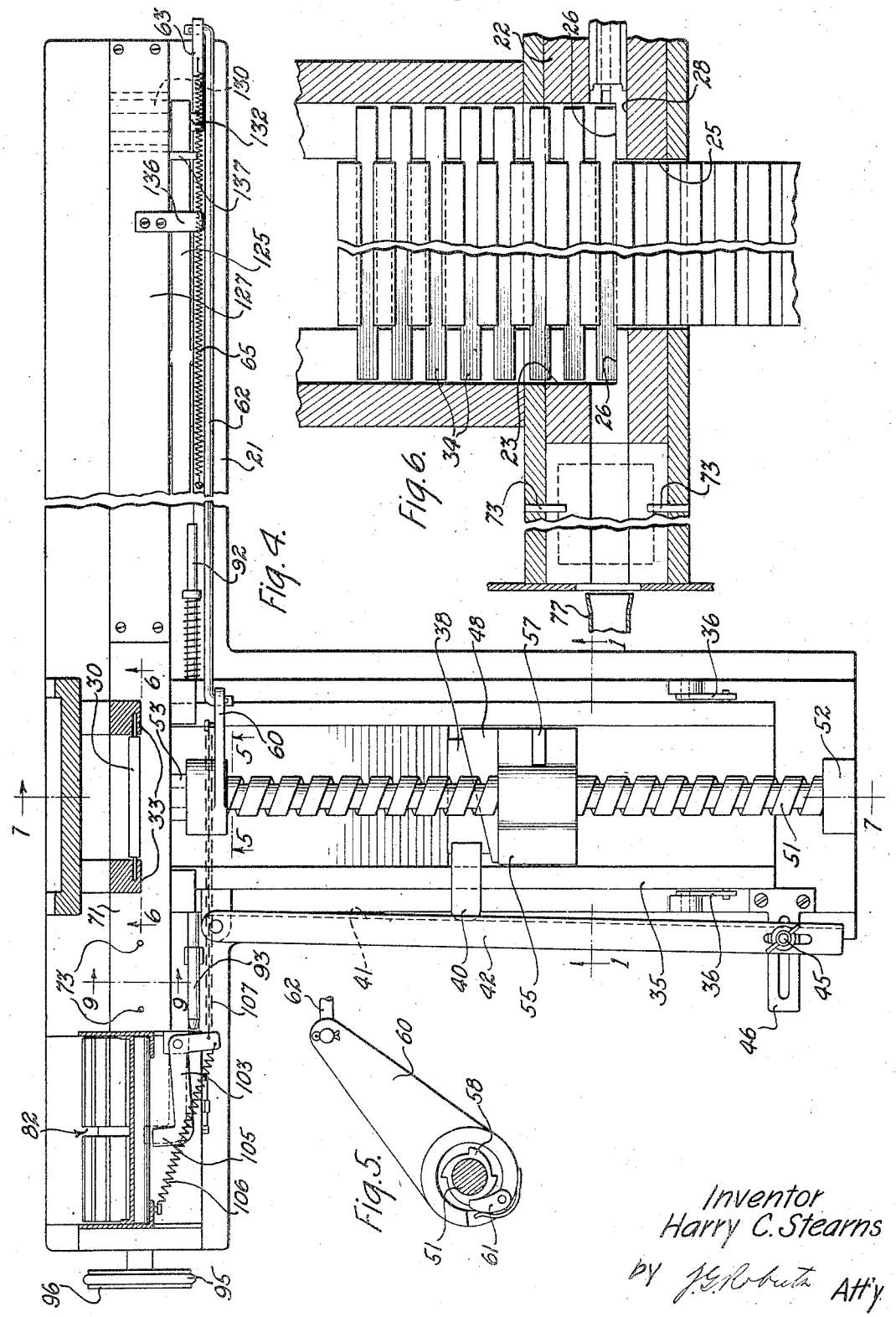

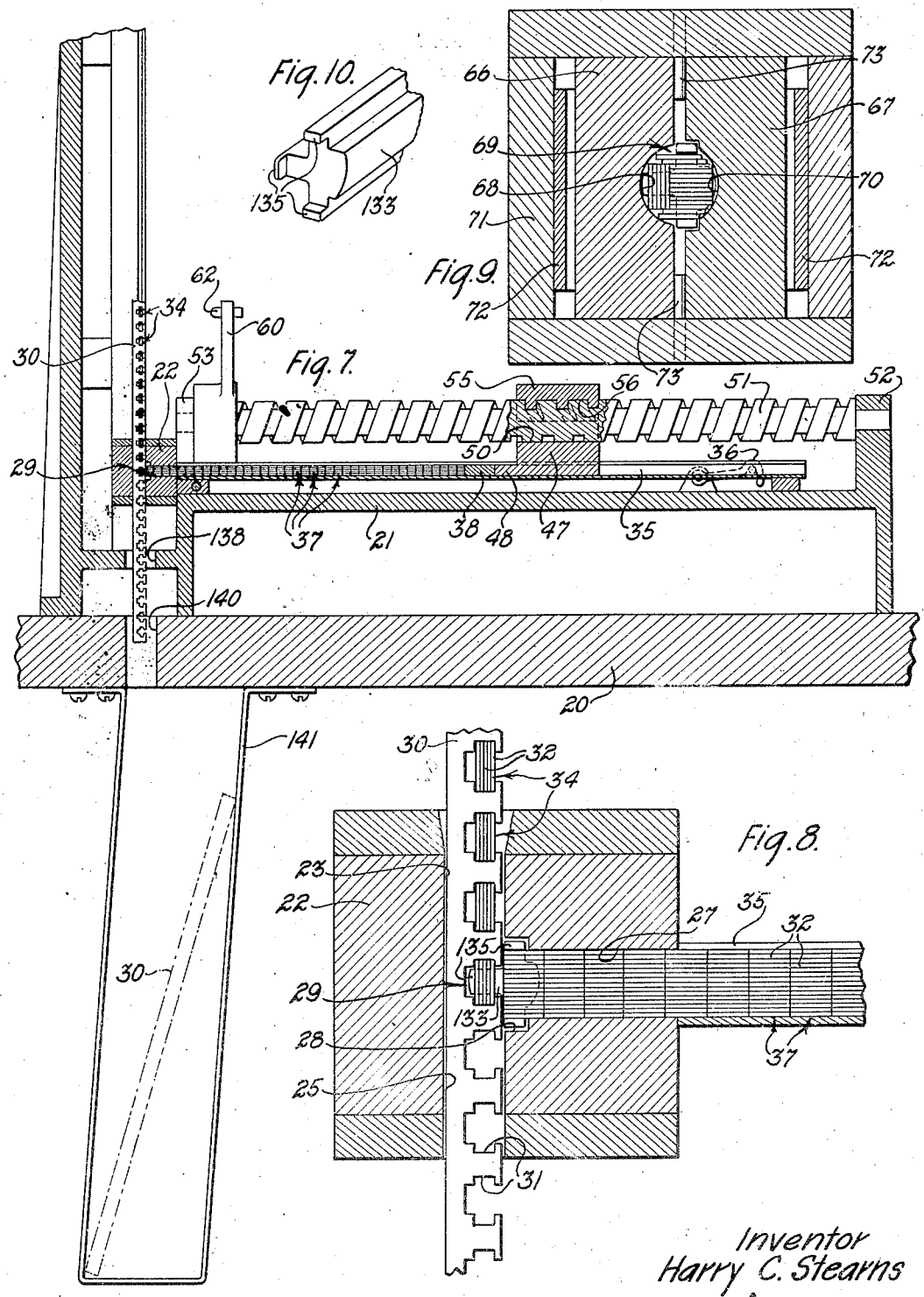

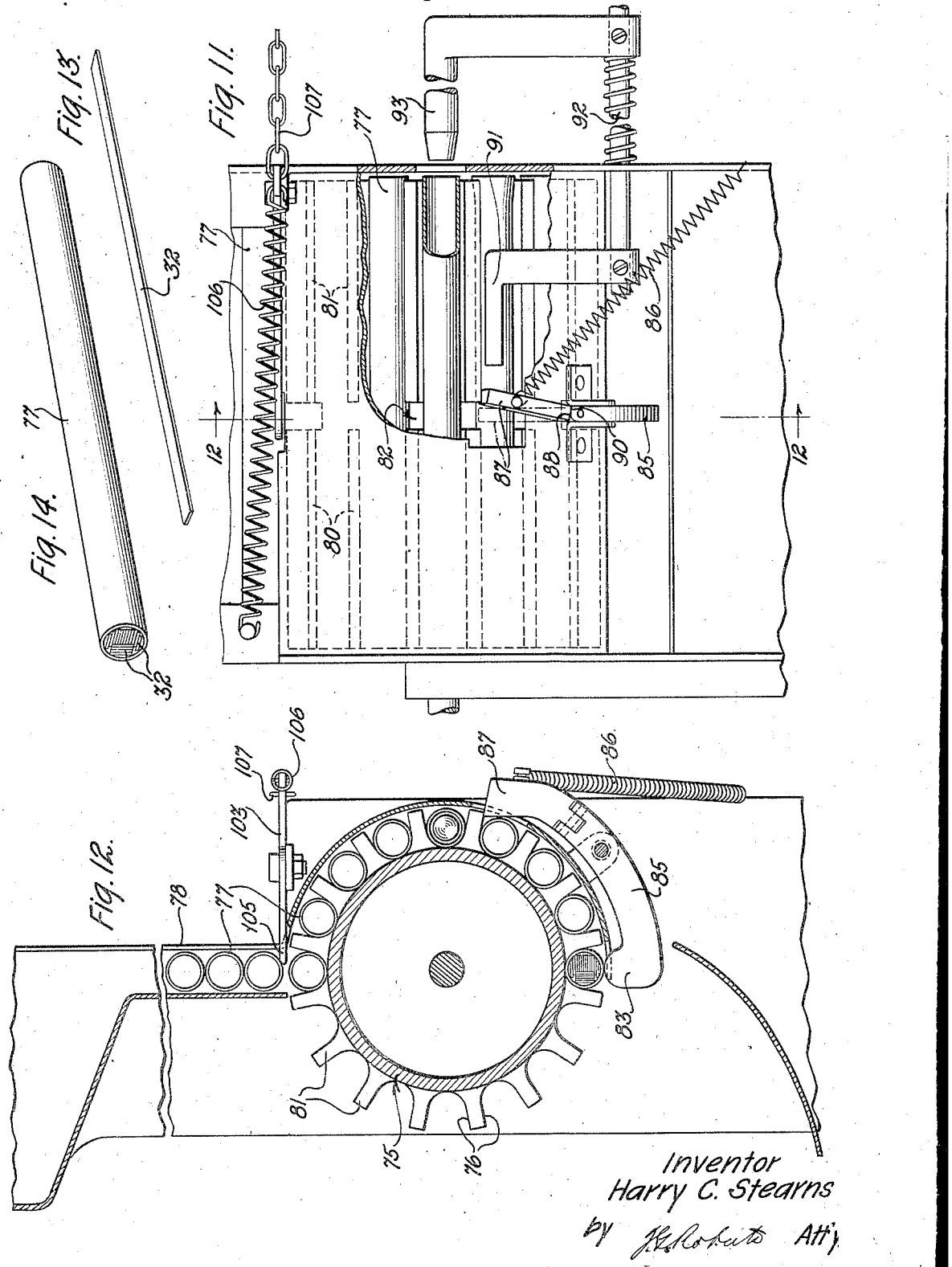

1,713,788

UNITED STATES PATENT OFFICE.

HARRY CARPENTER STEARNS, OF OAK PARK, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR ASSEMBLING ARTICLES.

Application filed August 9, 1927. Serial No. 211,691.

This invention relates generally to methods of and apparatus for assembling articles, and more particularly to methods of and apparatus for assembling cores for magnetic coils.

Objects of the invention are the provision of a simple, economical and effective method of assembling members within a casing and the provision of an efficient apparatus by means of which the method may be practiced.

In accordance with the general features of the invention, in one apparatus embodying the invention and by means of which the method may be practiced, there are provided a plurality of angularly disposed magazines each containing prearranged groups of core members, and a chamber is positioned to receive the groups to form a larger group of a predetermined pattern. A forming chamber is located adjacent the receiving chamber, a rotatable carrier having a plurality of compartments for holding casings is mounted adjacent the forming chamber and a pivoted catch is provided for preventing rotation of the carrier when a casing is in the lowermost compartment of the carrier. In alignment with the receiving chamber is a plunger for advancing core members from the receiving chamber into and through the forming chamber and into a casing in the rotatable carrier and for tripping the catch to release the carrier so that the latter may be rotated. When the plunger is retracted some of the groups of core members are fed into the receiving chamber by gravity, while other groups are fed by a block slidably mounted in one of the magazines and intermittently actuated by an adjustable ratchet and screw means to advance the groups of core members predetermined amounts. The plunger is reciprocated by means of a rocker arm oscillated by means of a wheel and pin connected to a source of power through an overload clutch. If the core members being advanced by the plunger from the receiving chamber into the compressing chamber or into a casing tend to jam, the clutch will slip to prevent straining any of the members and the plunger will impart impacts upon the core members to position them in the casing.

The invention will be clearly understood from the following detailed description of an apparatus embodying the invention and by means of which the method forming a part of the invention may be practiced, taken in conjunction with the accompanying drawings which illustrate the apparatus described.

In the drawings,

Fig. 1 is a front elevational view, partly in section, of an article assembling apparatus, the sectional part of which view is taken on line 1—1 of Fig. 4;

Fig. 2 is a fragmentary side elevation thereof, a part of which is a sectional view taken on line 2—2 of Fig. 1;

Fig. 3 is a fragmentary sectional view thereof taken on line 3—3 of Fig. 2;

Fig. 4 is an enlarged horizontal sectional view thereof taken on line 4—4 of Fig. 1;

Fig. 5 is an enlarged fragmentary sectional view thereof taken on line 5—5 of Fig. 4;

Fig. 6 is an enlarged fragmentary sectional view thereof taken on line 6—6 of Fig. 4;

Fig. 7 is a vertical sectional view thereof taken on line 7—7 of Fig. 4;

Fig. 8 is an enlarged detailed sectional view of a part of the apparatus illustrated in Fig. 7;

Fig. 9 is an enlarged sectional view taken on line 9—9 of Fig. 4;

Fig. 10 is an enlarged fragmentary perspective view of a plunger forming a part of the apparatus;

Fig. 11 is an enlarged fragmentary elevational view, partly broken away, of a rotatable casing supporting means forming a part of the apparatus;

Fig. 12 is a fragmentary sectional view thereof taken on line 12—12 of Fig. 11.

Fig. 13 is a perspective view of a core member of the type which the apparatus illustrated is designed to assemble, and Fig. 14 is a perspective view of a finished article which may be assembled by employing the apparatus illustrated and by practicing the method embodying the invention.

The apparatus illustrated by the drawings is one by means of which prearranged groups of laminations of a magnetic material may be formed into a single compact group of a circular cross section and inserted within a tubular insulating casing made of any suitable insulating material, such as paper, to form a core for a magnetic coil. However, the invention is not limited to the specific embodiment of the invention illustrated by the drawings, but the invention embraces any type of apparatus included within the scope of the annexed claims and which may be employed to practice the method defined in the claims.

Referring now to the drawings in detail, in which like numerals designate like parts throughout the several views, the numeral 20 (Fig. 1) indicates a table upon which is rigidly mounted a casting 21 forming a framework for a portion of the apparatus. Rigidly secured upon a portion of the casting 21 is a block 22 (Figs. 6, 7 and 8) having a vertical slot extending therethrough, which slot comprises a large upper portion 23 (Fig. 6) and a smaller lower portion 25, thereby forming shoulders 26—26 within the block 22. A horizontal slot 27 (Fig. 8) communicating with the vertical slot at the junction of the upper portion 23 and the lower portion 25 thereof is also formed in the block 22 and an aperture 28 (Fig. 6) extends horizontally through the block 22 at right angles to the slot 27 and communicates with the above described horizontal and vertical slots at their point of intersection to form therewith a receiving chamber indicated generally by the numeral 29 (Fig. 7).

A magazine 30 having a plurality of irregular shaped channels 31—31 formed therein, which channels contain prearranged groups 34—34 of laminations 32—32 forming core members for the assembled articles, is sildably mounted in guides 33—33 secured upon a portion of the casting 21 and extends into the vertical slot 23 in the block 22 where it is supported, as is shown in Fig. 6, by the overhanging ends of the laminations 32—32 forming the lowermost group 34 within the magazine, resting upon the shoulders 26—26 in the block 22.

A second magazine 35 is secured by means of latches 36—36 in a horizontal position upon a portion of the casting 21 in communication with the horizontal slot 27 in the block 22 (Figs. 7 and 8). The magazine 35 contains a plurality of prearranged, adjacent groups 37—37 of laminations 32—32 of the same type as the laminations retained in the magazine 30 and the prearranged groups of laminations 37—37 are fed into the slot 27 by means of a wedge shaped block 38 slidably mounted within the magazine 35. The block 38 has a projecting finger 40 formed thereon which engages within a groove 41 in an arm 42 which is pivoted to the casting 21 at its inner end and which is adjustably secured at its opposite end by means of a screw 45 which cooperates with a slot in an arm 46 extending from the casting 21. A block 47 having a forwardly extending triangular portion 48 formed thereon is also slidably mounted within the magazine 35 to cooperate with the above described block 38. The block 47 has a semi-circular groove 50 formed therein which partially encircles an elongated screw 51 rotatably secured in standards 52 and 53 forming a part of the casting 21, and a companion block 55 having a threaded groove 56 designed to cooperate with the threads upon the screw 51 is pivotally mounted upon the block 47 and secured in operative position as shown in Fig. 1 by means of a latch 57.

A ratchet wheel 58 (Fig. 5) is rigidly secured upon the screw 51 adjacent the standard 53 and an oscillating arm 60 carrying a spring pressed pawl 61 for cooperating with the ratchet wheel 58 encircles the latter member and is oscillated in a manner more fully described hereinafter by means of a rod 62 connected to an arm 63 which is urged to the left as seen in Fig. 1 by means of a coil spring 65.

Mounted adjacent the block 22 are a pair of compressing blocks 66 and 67 (Fig. 9) having companion grooves 68 and 70 formed therein, which grooves cooperate to provide a forming chamber designated generally by the numeral 69 which is in alignment with the aperture 28 and the chamber 29 in the block 22 (Fig. 8). The blocks 66 and 67 are mounted within a casing 71 and are urged inwardly by means of leaf springs 72—72 against vertical centering pins 73—73 to insure accurate alignment of the forming chamber 69 with the aperture 28 in the block 22.

Mounted adjacent the compressing blocks 66 and 67 is a rotatable carrier 75 (Figs. 11 and 12) having a plurality of compartments 76—76 formed upon its periphery for receiving tubular casing members 77—77 from a magazine 78 in communication therewith and the carrier 75 is so positioned that a casing in the lowermost compartment 76 thereon is in alignment with the forming chamber 69 described above. The compartments 76—76 are formed by two series of projecting partitions 80—80 and 81—81 so positioned that each partition of each series is parallel with a partition in the other series, thereby forming a central circular groove 82 around the periphery of the carrier into which a cam portion 83 formed upon one end of a pivoted lever 85 is urged by means of a spring 86. Pivotally mounted upon the other end of the lever 85 is a catch 87 which is urged towards the right of the apparatus as seen in Fig. 11 by means of the spring 86 which spring serves the double function of exerting force upon both the lever 85 and upon the catch 87. The catch 87 is limited in its movement to the right as seen in Fig. 11 by shoulders 88 and 90 formed upon the lever 85 and the catch 87, respectively, which shoulders contact when the catch 87 has been rotated to the position shown in full lines in Fig. 11, in which position the catch 87 contacts with one of the partitions 81—81 and prevents rotation of the carrier 75. A trip member 91 carried upon a spring pressed rod 92, which is reciprocated in a manner hereinafter described, is positioned so as to engage the catch 87 and rotate the catch from the position shown in full lines in Fig. 11 toward the left into the position shown in dotted lines in that figure so that the carrier 75 may be rotated. A plunger 93 is also mounted upon the rod 92 in such a position that it may enter one end of a casing 77 in the carrier 75 for the purpose of enlarging the opening in that end of the casing. The carrier 75 is rotated when the catch 87 is positioned within the groove 82 in the carrier by means of a belt 95 (Figs. 1 and 2) and pulleys 96, 97—97 and 98, the latter of which pulleys is connected to a suitable source of power, such as an electric motor 100, through a suitable drive 101, driving a shaft 102 upon which the pulley 98 is mounted, the belt 95 slipping over one of the pulleys 96 or 98 when the catch 87 is in the position shown in full lines in Fig. 11 and prevents rotation of the carrier 75.

A trigger 103 (Figs. 4 and 12) is pivotally mounted directly above the carrier 75 in such a position that a finger 105 formed upon the trigger 103 may be advanced into the magazine 78 by means of a spring 106 to support the column of casings 77—77 in the magazine 78 while the carrier 75 is being rotated in order to prevent any possibility of the casings jamming during the rotation of the carrier. The trigger 103 is normally swung so that the finger 105 is withdrawn from within the magazine 78 in the position shown in full line in Fig. 4 by means of a chain 107 which connects the trigger 103 to the oscillating arm 60 hereinbefore described.

Upon the end of the shaft 102 opposite the end bearing the pulley 98 is rigidly mounted a plate 110 (Fig. 2) forming a part of an overload clutch designated generally by the numeral 108, which clutch comprises the plate 110 provided with a pair of diametrically opposed pins 111—111 which extend into slots 112—112 formed in compression members 113—113 which are urged towards the center of the plate 110 as is shown in Fig. 3 by means of springs 115—115. Loosely mounted upon the shaft 102 adjacent the plate 110 is a second clutch plate 116 retained upon the shaft 102 by means of a plate 117. The plate 116 is provided upon the side thereof adjacent the plate 110 with a hub 118 having circular portions 120—120 and flat portions 121—121 formed thereon, which hub is positioned between the compression members 113—113 with the flat portions 121—121 normally in contact with the compressing members in the position shown in Fig. 3.

The plate 116 carries a pin 122 (Figs. 1, 2 and 3) which extends into a slot 123 formed in a rocker arm 125 which is pivotally mounted by means of a stub shaft 124 upon a hanger 126 suspended from the table 20. Slidably mounted between guide members 127 and 128 (Fig. 1) is a cross head 130 having a slot 131 formed therein in which a pin 132 which is carried by the upper end of the rocker arm 125 extends so that the cross head 130 is reciprocated between the guide members 127 and 128 by the rocker arm. A plunger 133 is rigidly secured upon the cross head 130 in alignment with the aperture 28 in the block 22, the plunger having a cross sectional outline, as is clearly shown in Fig. 10, corresponding to that of the aperture 28, and the plunger is provided upon the end adjacent the aperture 28 with a plurality of prongs 135—135 for encircling groups of laminations in the aperture 28 in the manner illustrated in Fig. 8.

The pin 132 upon the upper end of the rocker arm 125 extends outwardly as shown in Fig. 1 so that when the upper end of the rocker arm 125 is oscillated towards the right hand side of the apparatus as seen in Fig. 1, the pin 132 comes in contact with the arm 63, as is shown in that figure, while a stop member 136 is mounted upon the guide member 127 to limit a rotation of the arm 63 towards the left as seen in Fig. 1, when the latter member is actuated by the spring 65. An arm 137 extends laterally from the cross head 130 in such a position that it will contact with the hereinbefore described rod 92 when the cross head is moved towards the left, as seen in Figs. 1 and 4.

Suspended from the table 20 and in alignment with slots 138 and 140 in the casting 21 and the table 20, respectively, is a receiver 141 for catching empty magazines 30 which may pass through the aperture 23 in the block 22 and through the above described apertures 138 and 140.

It is believed that the operation of the apparatus will be clearly understood from the foregoing description and from the following description of its operation. The operation of the apparatus is as follows: The magazine 78 is filled with a supply of casings 77—77 and the carrier 75 is rotated until a casing positioned in the lowermost compartment thereof, as shown in Fig. 12, actuates the cam portion 83 of the lever 85 to cause the catch 87 to contact with one of the partitions 81—81 and to thereby stop rotation of the carrier 75. A magazine 30 carrying a plurality of prearranged groups 34—34 of laminations 32—32 is then inserted within the guides 33—33 so that the lower end of the magazine 30 extends into the slot 23 in the block 22 and is supported in that position by the overhanging ends of the lowermost group 34 of laminations 32—32 resting upon the shoulders 26—26 in the block 22, in which position the group of laminations are within the receiving chamber 29.

The latch 35 which secures the block 55 mounted on the block 47 in operative association with the screw 51 is then released and the block 55 rotated about its pivot upon the block 47 until the threaded groove 56 in the block 55 is out of contact with the threads of the screw 51. The blocks 47 and 38 are then drawn toward the forward side of the apparatus as viewed in Fig. 4 to permit the insertion of a magazine 35 carrying a plurality of prearranged groups 37—37 of laminations in communication with the slot 27 in the block 22. After the magazine 35 has been secured in position by means of the latches 36—36, the block 38 is moved into contact with the outermost group of laminations in the magazine 35, the block 47 is moved into contact with the block 38, the blocks 38 and 45 are advanced to force the innermost group of laminations into the receiving chamber 29 in the block 22, and the block 55 is secured in operative association with the screw 41 and latched in position by means of the latch 57.

Electrical energy is supplied to the motor 100 which then rotates the shaft 102 through the drive 101 whereupon the plate 110 of the overload clutch 108 is also rotated. The compression members 113—113 which are forced into contact with the hub 118 on the plate 116 by the springs 115—115 are rotated by the pins 111—111 about the hub 120 until the compression members 113—113 come into contact with the flat portions 121—121 of the hub 118 when the latter member will also be rotated and the plates 110 and 116 will rotate in unison. The pin 122 carried by the plate 116 will oscillate the rocking arm 125 about the stub shaft 124 on the hanger 126, thereby causing the cross head 130 carrying the plunger 133 to be reciprocated to the left and right as seen in Fig. 1 between the guide members 127 and 128. When the plunger 133 advances towards the left as seen in Fig. 1, the end of the plunger enters the receiving chamber 29 where it comes into contact with the lowermost group 34 of laminations in the magazine 30 and the inner group of laminations fed into the receiving chamber by the block 38, with the prongs 135—135 on the plunger in contact with an outer lamination of each of these groups as is shown in Fig. 8. The groups of laminations will be advanced by the plunger 133 through the aperture 28 in the block 22 and into the forming chamber 69 where the groups of laminations are compressed, by means of the springs 72—72 acting against the blocks 66 and 67, into a single compact group having a predetermined pattern which is substantially circular in cross section. As the plunger 133 advances still further towards the left of the apparatus, as seen in Fig. 1, the compacted group of laminations will be advanced from the forming chamber 69 into a casing 77 in the lowermost compartment of the rotatable carrier 75. When the cross head 130 approaches the extremity of its stroke towards the left hand side of the apparatus, the arm 137 carried thereby comes into contact with the rod 92 and forces the latter towards the left, and the trip member 91 carried upon the rod 92 releases the catch 87 to permit rotation of the carrier 75 and simultaneously with the latter action the plunger 93 carried by the rod 92 enters one end of an unfilled casing 77 to enlarge the opening therein so as to facilitate the entrance of a group of laminations therein.

When the upper end of the rocker arm 125 is oscillated towards the left as seen in Figs. 1 and 4, the pin 132 carried thereby moves out of contact with the arm 63 and the arm is rotated towards the left by the spring 65 until it comes into contact with the stop 136 during which movement the rod 62 is forced towards the left as seen in Fig. 1 and oscillates the arm 60 to cause the pawl 61 carried thereby to slide over one of the teeth of the ratchet wheel 58 until it comes into contact with the driving face of one of the teeth on the ratchet wheel.

As the arm 60 is oscillated towards the left hand side, as seen in Fig. 4, the tension on the chain 107 is released and the trigger 103 is permitted to be rotated by the spring 106 until the finger 105 upon the trigger is advanced into the magazine 78 to support the column of casings 77—77 in the magazine 78 during the rotation of the carrier 75.

After the plunger 133 has reached the end of its stroke in the left hand direction, it is reciprocated in the opposite direction and is withdrawn from within the forming chamber 69, the receiving chamber 29 and the aperture 28 in the block 22, whereupon the spring pressed rod 92 will be moved towards the right hand side of the apparatus to retract the plunger 93 and the trip member 91 to permit the spring 86 to move the catch 87 into operative position as shown in Fig. 11 to prevent a rotation of the carrier 75.

During the advancing motion of the plunger 133 and during a part of its retractive motion, a portion of the plunger is positioned in one of the channels 31—31 in the magaizne 30 and thereby supports the magazine, but upon the withdrawal of the plunger from the receiving chamber 29 in the block 22, the magazine 30 is unsupported and drops through the slots 23 and 25 in the block 22 until the ends of the next lowermost group of laminations comes into contact with the shoulders 26—26 in the block 22, thereby placing another group of laminations within the receiving chamber 29 in alignment with the plunger 133. After the magazine 30 has been partially emptied a second magazine may be inserted within the guide members 33—33 so as to rest upon the first magazine 30 to provide a continual supply of prearranged groups of laminations in the receiving chamber 29. When one of the magazines 30 has been completely emptied it will fall through the openings 138 and 140 into the receiving member 141 suspended from the table 20, as is shown in dotted outline in Fig. 7.

When the upper end of the rocker arm 125 approaches the right hand extremity of its oscillation, the pin carried thereby comes into contact with the arm 63 and rotates the arm in the same direction, thereby oscillating the arm 60 through the rod 62 to cause the pawl 61 to rotate the screw 51 through the ratchet wheel 58 and through the chain 107 to cause the withdrawal of the finger 105 on the trigger 103 from the magazine 78. When the screw 51 is rotated by the pawl 61 and ratchet wheel 58, the threads upon the screw 51 coact with the threads in the groove 56 formed in the block 55 to cause the blocks 55 and 47 to be advanced against the block 38 toward the block 22, thereby advancing a group of laminations 37 in the magazine 35 into the receiving chamber 29 in the position shown in Fig. 8 adjacent that assumed by the lowermost group of laminations in the magazine 30.

When the pin 122 upon the plate 116 is oscillating the lower end of the rocker arm 125 toward the right as seen in Fig. 1 in the direction necessary to cause the plunger 133 to advance the laminations through the above described members into a casing, the pin is in the lower end of the slot 123 in the rocker arm 125, and due to the length of the lever arm between the point of contact of the pin in the slot 123 and the stub shaft 124 upon the hanger 126 about which the rocker arm oscillates, the latter member is oscillated at the slowest rate possible with a given angular velocity of the pin 122 and also due to the length of the above described lever arm the force transmitted to the plunger 133 is the maximum amount which may be transmitted thereto. However, when the rocker arm 125 is being oscillated in the opposite direction by the pin 122 so as to retract the plunger 133 towards the right as seen in Fig. 1, the pin 122 is acting within the slot 123 with a shorter lever arm than when the pin is within the lower end of the slot 123, and in consequence since the angular velocity of the pin 122 is constant the upper end of the rocker arm 125 and the plunger 133 are retracted towards the right as seen in Fig. 1 at a more rapid rate than that at which they are advanced towards the left. This so-called "quick return motion" permits the rapid replacement of the various members in their normal or inoperative positions and provides ample time for the various members to assume their normal positions before the plunger 133 starts upon another advancing stroke.

Should the laminations jam for any reason while being advanced by the plunger 133, the overload clutch 108 will permit force to be applied to the plunger 133 until a predetermined value, which is dependent upon the force of the springs 115—115, has been reached when the compression members 113—113 will be forced apart by the hub 118 so that the circular portions 120—120 thereon are in contact with the compression members 113—113. The hub 118 and the members driven thereby will remain stationary while the compression members 113—113 rotate thereabout in contact with the circular portions 120—120, but as soon as the compression members reach the end of the circular portions upon the hub 118 and start to come into contact with the flat portions 121—121 thereon, the springs 115—115 will coact to force the compression members together and will cause a partial rotation of the hub member 118 in a direction opposite that in which it was formerly rotated until the compression members again contact with the flat portions 121—121 on the hub member. It will thus be seen that the reverse motion of the hub member 118 just described will transmit a slight reverse motion through the rocker arm 125 to the plunger 133, but that when the compression members 113—113 contact with the flat portions 121—121 upon the hub member 118 the reverse motion will cease and the hub 118 will again be rotated in its original direction of rotation until the plunger 133 comes into contact with the laminations again, thereby imparting an impact or blow upon the group of laminations which tends to drive the laminations in the desired direction. If after the plunger 133 has again come into contact with the group of laminations, the force required to advance the laminations is still in excess of that permissible by the overload clutch 108, the above steps will again be followed through to cause the plunger 133 to again impact upon the group of laminations. It will thus be seen that in case of an overload, the overload clutch 108 will relieve the excess load to prevent straining any of the members and so long as the force required to advance the plunger 133 is above a predetermined value the plunger 133 will continue to impart a series of impacts upon the group of laminations which is directly in alignment therewith until the group of laminations is driven into the desired position within a casing in the carrier 75.

Should the width of the laminations 32—32 forming the prearranged groups 37—37 in the magazine 35 vary, the projecting finger 40 (Fig. 4) on the block 38, the arm 42, the inclined face of the block 38 and the triangular portion 48 on the block 47 cooperate to form an adjusting means by means of which compensation for variations in width of the laminations may be effected so that upon each actuation of the block 47 by the screw 51, the groups of laminations 37—37 will be advanced through a distance which is equal to the width of one lamination. In case the laminations are of a greater width than the distance traveled by the block 47 by a single actuation thereof through the screw 51, the arm 42 is swung towards the right as seen in Fig. 4 until the finger 40 upon the block 38 extends into the groove 41 in the arm 42. Since the arm 42 is inclined with respect to the direction of travel of the block 38, when the arm 42 and the finger 40 are in this relationship, the finger 40 will bear against the groove 41 upon each actuation of the block 47 and will be forced towards the right as seen in Fig. 4 as it is moved inwardly towards the block 22. As the block 38 is moved towards the right, the inclined face thereon cooperates with the inclined face on the triangular portion 48 on the block 47 to advance the block 38 an additional distance over that through which it was advanced by the inward motion of the block 47. If the laminations are of less width than those which will be accurately advanced with the arm in the setting shown in Fig. 4, the arm may be swung further to the left so as to cause a decrease in the distance through which the block 38 is caused to travel, or if the laminations are of a still greater thickness the arm 42 may be swung further to the right to increase the distance of travel of the block 38. By this arrangement it is possible to control the effective feeding stroke of the block 38 so as to insure accurate feeding of the groups of laminations 37—37 from the magazine 35 into the receiving chamber 29 in the block 22.

What is claimed is:

1. An apparatus for assembling articles, which comprises a stationary chamber, means for feeding groups of members into the chamber to form a predetermined pattern therein, and means for transferring the members in the chamber directly therefrom into a casing.

2. An apparatus for assembling articles, which comprises a plurality of magazines for retaining prearranged groups of members, a chamber communicating with the magazines for receiving groups of members therefrom, means for supporting a casing, and means for transferring the groups of members in the chamber directly therefrom, into a casing in the casing supporting means.

3. An apparatus for assembling articles, which comprises a chamber, means for feeding groups of core members into the chamber to form a predetermined pattern therein, a forming chamber adjacent the first mentioned chamber for forming the core members into a compact group, and means for advancing the core members in the first mentioned chamber directly into and through the forming chamber and into a casing.

4. An apparatus for assembling articles, which comprises a stationary chamber, means for feeding groups of core members into the chamber to form a predetermined pattern therein, means for supporting a casing in alignment with the chamber, and a plunger for advancing core members from the chamber into a casing in the casing supporting means.

5. An apparatus for assembling articles, which comprises a chamber, means for feeding groups of core members into the chamber to form a predetermined pattern therein, a forming chamber for forming the core members into a compact group, means for supporting a casing in alignment with the forming chamber, a plunger for advancing core members from the first mentioned chamber through the forming chamber and into a casing in the casing supporting means, and means for reciprocating the plunger.

6. An apparatus for assembling articles, which comprises a plurality of magazines for retaining prearranged groups of core members therein, a chamber for receiving a group of core members from each of the magazines to form a predetermined pattern of the core members, means for compressing the core members into a compact group of a desired cross section, and means for advancing core members from the chamber through the compacting means and into a casing.

7. In an article assembling apparatus including a chamber, means for feeding groups of core members into the chamber to form a single group thereof, and means for supporting a casing, a plunger for advancing the group of core members from the chamber into a casing in the casing supporting means, and means for reciprocating the plunger, said last mentioned means serving to cause the plunger to impart a series of impacts upon the core members when the force required to advance the group exceeds a predetermined value.

8. An apparatus for assembling articles, which comprises a chamber, means for feeding prearranged groups of core members into the chamber to form a predetermined pattern therein, means for compressing the core members into a compact group of a desired cross section, means for supporting a casing adjacent the compressing means, a plunger for advancing a group of core members from the chamber through the compressing means and into a casing in the casing supporting means, and means for reciprocating the plunger, said last mentioned means serving to impart a series of impacts upon the group of core members when the force required to advance the group exceeds a predetermined value.

9. In an article assembling apparatus including a chamber, means for supporting a casing, and means for advancing core members from the chamber into a casing in the casing supporting means, means for feeding core members into the chamber comprising a magazine communicating with the chamber for retaining core members, a block for advancing the core members toward the chamber and adjustable means for intermittently actuating the block to feed the core members a predetermined distance upon each actuation thereof.

10. An apparatus for assembling articles, which comprises a chamber, means for feeding core members into the chamber to form a predetermined pattern therein, rotatable means for supporting casings adjacent the chamber, releasable means for preventing rotation of the rotatable means when casings are supported therein, means for advancing core members from the chamber into a casing in the rotatable means and for rendering the releasable means inoperative, and means functionally operable when the releasable means is inoperative for rotating the rotatable means.

11. An apparatus for assembling cores for magnetic coils, which comprises means for retaining prearranged groups of laminations of a magnetic material, a chamber for receiving groups of laminations from the retaining means, means for forming the resulting group into a compact group having a desired cross section, and means for advancing the group of laminations from the chamber through the forming means and into a tube.

12. An apparatus for assembling cores for magnetic coils, which comprises means for feeding prearranged groups of laminations of a magnetic material from different directions toward a common point, means at that point for receiving the groups of laminations in a single group having a predetermined pattern, means for compacting the last mentioned group into one having a circular cross section, and means for advancing said group from the receiving means through the compacting means and into a circular insulating tube.

13. A method of assembling articles, which consists in feeding a prearranged group of core members from each of a plurality of supplies into a common point to form a predetermined pattern, and transferring the resulting group of core members into a casing.

14. A method of assembling articles, which consists in feeding a prearranged group of core members toward a point, simultaneously feeding another prearranged group of core members from another direction toward the same point to form a single group having a predetermined pattern with the first mentioned group, and transferring the resulting group into a casing.

15. A method of assembling cores for magnetic coils, which consists in feeding a prearranged group of laminations toward a point, simultaneously feeding another prearranged group of laminations from another direction toward the same point to form a single group of laminations having a predetermined pattern with the first mentioned group, and transferring the resulting group into a circular tube.

16. In an article assembling apparatus, a chamber, a magazine communicating therewith for containing prearranged groups of core members, and adjustable means for advancing a group of the core members from the magazine into the chamber.

17. In an article assembling apparatus, a chamber, a magazine communicating therewith for containing prearranged groups of core members, and intermittently operable adjustable means for advancing the prearranged groups of core members in the magazine to successively feed a group of the core members into the chamber upon each actuation of the advancing means.

18. In an article assembling apparatus, a material advancing plunger, and means operable when the force required to advance the material exceeds a predetermined value for causing the plunger to impart a series of impacts upon the material being advanced thereby.

19. In an article assembling apparatus, a material advancing plunger, and means for reciprocating the plunger including a clutch designed to impart to the plunger a reciprocatory motion more rapid than the normal reciprocatory motion thereof when the force required to advance the material being advanced by the plunger exceeds a predetermined value.

20. In an article assembling apparatus, a material advancing member, and means for actuating said member including a driving member having a cam face thereon, a driven member having a cam face thereon cooperating with that on the driving member, and resilient means cooperating with the cam faces to normally retain said driving and driven members in a predetermined relative position and yieldable when the force required to advance the material advancing means exceeds a predetermined value to permit relative movement between said driving and driven members, said cam faces cooperating with each other and with the resilient means when they assume another predetermined relative position to impart a reverse motion to the driven member.

21. In an article assembling apparatus, a material advancing member, and means for reciprocating the member comprising a driving member, a driven member having extending therefrom a hub provided with oppositely disposed cam faces and oppositely disposed cylindrical faces, means for operatively connecting the driven member to the plunger, and yieldable means carried by the driving member normally engaging the cam faces on said hub to transmit power from the driving member to the driven member and designed to yield when the force required to advance the material advancing member exceeds a predetermined value, then to engage the cylindrical faces on said hub, and to impart a reverse motion to the driven member when the cam faces are again reached whereby a rapid reciprocatory motion is imparted to the material advancing member.

22. A method of assembling articles, which consists in feeding prearranged groups of core members from each of a plurality of supplies into a common point to form a predetermined pattern, compressing the resulting group of core members into a compact group, and transferring the thus formed group of core members into a casing.

23. A method of assembling articles, which consists in treating a prearranged group of members toward a point, simultaneously feeding another prearranged group of core members from another direction toward the same point to form a single group having a predetermind pattern with the first mentioned group, forming the resulting group into one having a desired cross section, and transferring the thus formed group into a casing having the same cross section.

24. A method of assembling cores for magnetic coils, which consists in feeding a prearranged group of laminations toward a point, simultaneously feeding another prearranged group of laminations from another direction toward the same point to form a single group of laminations having a predetermined pattern with the first mentioned group, forming the resulting group into one having a circular cross section, and transferring the thus formed group of laminations into a circular insulating casing.

In witness whereof, I hereunto subscribe my name this 29th day of July, A. D., 1927.

HARRY CARPENTER STEARNS.